United States Patent [19]
Duncan

[11] 3,889,558
[45] June 17, 1975

[54] SHOCK ABSORBER NUT REMOVING TOOL

[76] Inventor: Gorden E. Duncan, 1505 Park Blvd., West Sacramento, Calif. 95691

[22] Filed: Feb. 19, 1974

[21] Appl. No.: 443,617

[52] U.S. Cl. ................................................ 81/55
[51] Int. Cl. ................................................ B25b
[58] Field of Search ............................ 81/55, 56

[56] References Cited
UNITED STATES PATENTS

| 2,267,012 | 12/1941 | Bowne | 81/55 |
| 2,814,221 | 11/1957 | Preslan | 81/56 |
| 3,175,388 | 3/1965 | Ford et al. | 81/55 |
| 3,394,623 | 7/1968 | Kinakin | 81/55 |

FOREIGN PATENTS OR APPLICATIONS

| 876,655 | 5/1953 | Germany | 81/55 |

Primary Examiner—James L. Jones, Jr.
Attorney, Agent, or Firm—Blair & Brown

[57] ABSTRACT

A shock absorber nut removing tool is provided including a nut engaging socket mounted on an elongate hollow drive shaft. A ratchet handle is connected to the upper end of the drive shaft and has a bore extending therethrough corresponding to the opening in the drive shaft. A shock absorber shaft engaging socket is positioned within the nut socket and is mounted on an elongate drive shaft which passes through the ratchet handle and the hollow drive shaft. A second ratchet handle is mounted on the upper end of the elongate drive shaft to drive the shaft engaging member. The device is used to provide relative rotation between the shaft and the nut of a shock absorber in a position in a motor vehicle difficult to reach.

1 Claim, 8 Drawing Figures

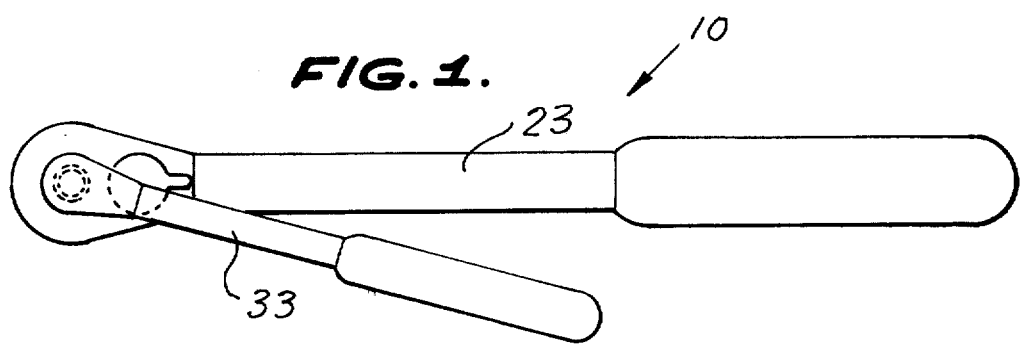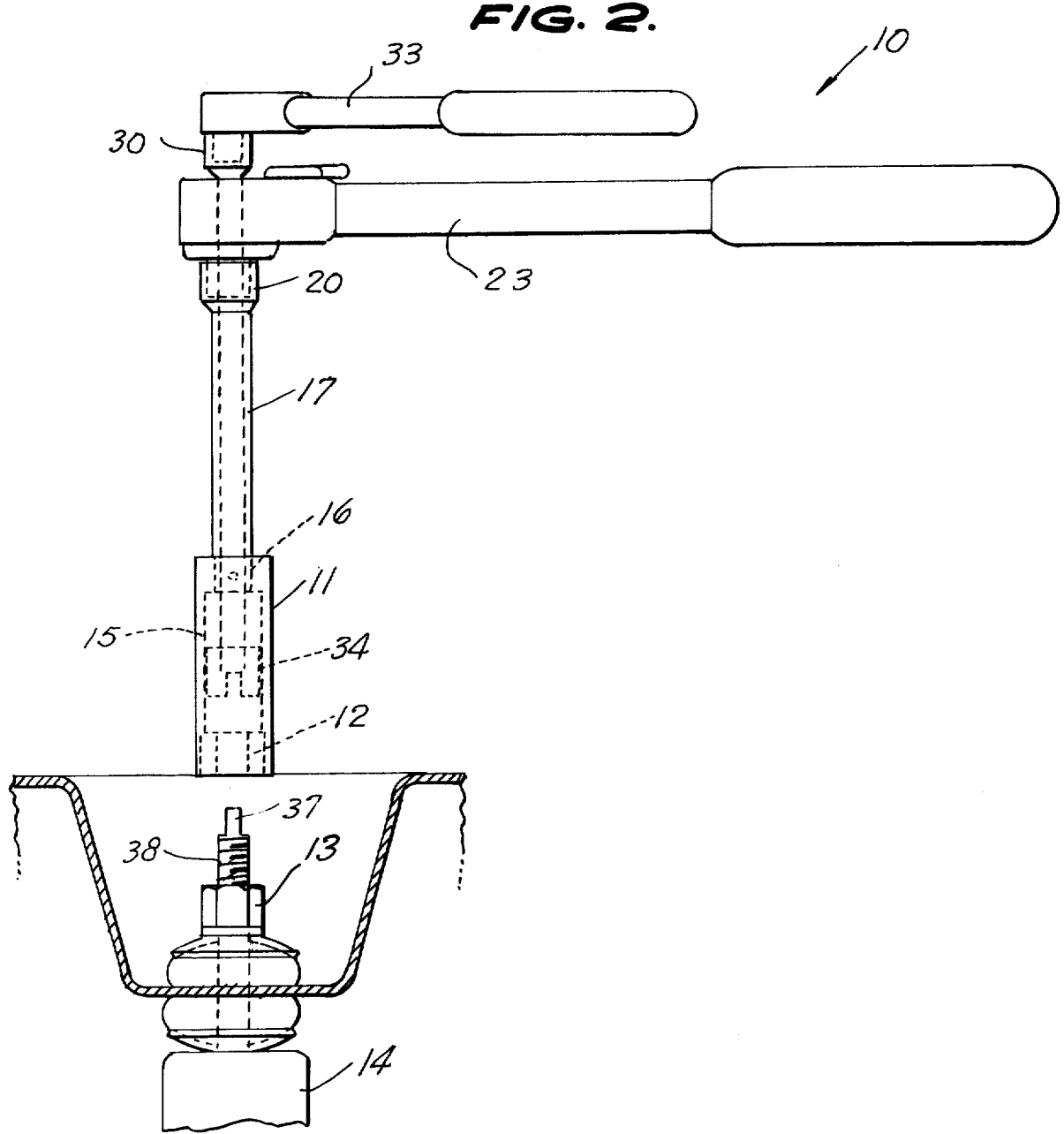

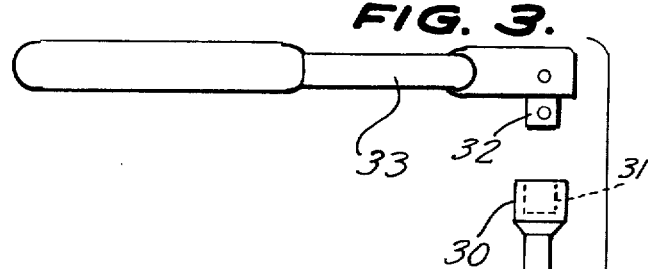
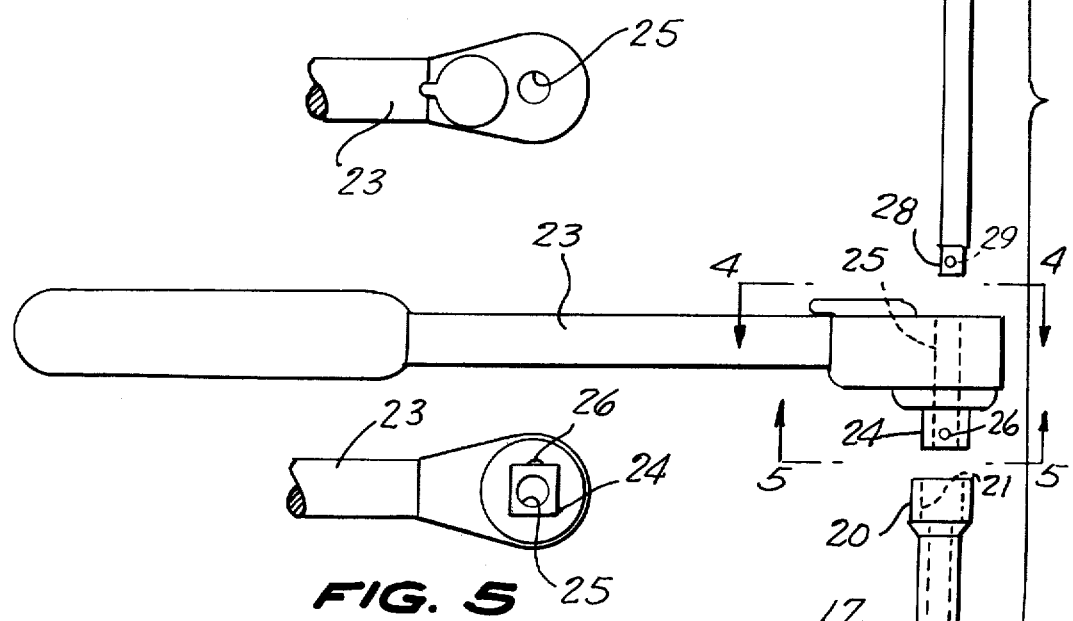
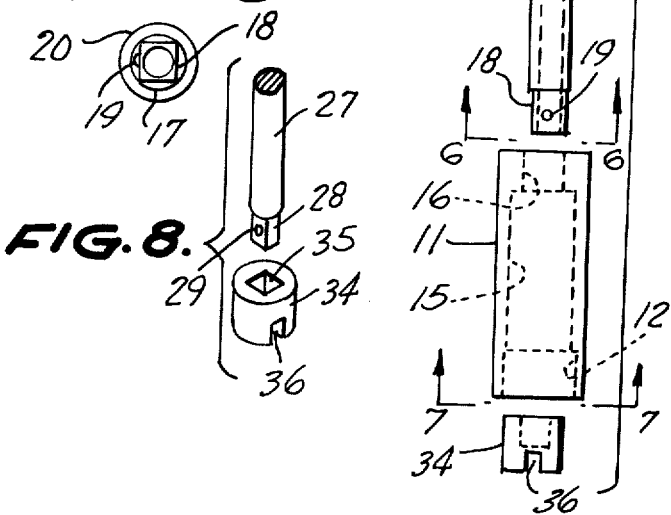
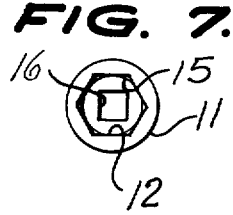

SHOCK ABSORBER NUT REMOVING TOOL

BACKGROUND OF THE INVENTION

FIELD OF THE INVENTION

The present invention is a special tool for assembling and disassembling a shock absorber on a motor vehicle.

SUMMARY OF THE INVENTION

The present invention includes a ratchet handle, drive shaft and nut engaging socket which are all hollow and have a drive shaft extending therethrough with a shaft engaging member on its lower end. A ratchet handle is provided for driving the inner shaft.

The primary object of the invention is to provide a special tool for assembling and disassembling shock absorbers on a motor vehicle in greatly restricted space.

Other objects and advantages will become apparent in the following specification when considered in light of the attached drawings.

BRIEF DESCRIPTION OF THE DRAWINGS

FIG. 1 is a top plan view of the invention;

FIG. 2 is a side elevation of the invention;

FIG. 3 is an exploded side elevation of the invention;

FIG. 4 is a fragmentary top plan view of the handle ratchet taken on the line 4—4 of FIG. 3, looking in the direction of the arrows;

FIG. 5 is a fragmentary bottom plan view of one of the handle ratchets taken on the line 5—5 of FIG. 3, looking in the direction of the arrows;

FIG. 6 is a bottom plan view of the hollow drive shaft taken on the line 6—6 of FIG. 3, looking in the direction of the arrows;

FIG. 7 is a bottom plan view of the nut socket taken on the line 7—7 of FIG. 3, looking in the direction of the arrows; and FIG. 8 is an exploded perspective of the solid drive shaft and shaft coupler.

DESCRIPTION OF THE PREFERRED EMBODIMENT

Referring now to the drawings in detail, wherein like reference characters indicate like parts throughout the several figures, the reference numeral 10 indicates generally a shock absorber nut removing tool constructed in accordance with the invention.

A shock absorber nut removing tool includes an elongate socket member 11 having a hexagonal internal shape 12 at its lower end for engaging a nut 13 of a shock absorber 14. The socket member 11 has a bore 15 extending inwardly thereof and communicating with the nut engaging portion 12. A square aperture 16 opens from the bore 15 through the upper end of the socket member 11.

An elongate hollow drive shaft 17 is provided with a square end portion 18 adapted to engage in the square aperture 16 of the socket member 11. A ball detend 19 provides a frictional lock between the shaft 17 and the socket member 11. The drive shaft 17 has an enlarged socket portion 20 on its upper end with a square socket 21 formed therein. A bore 22 extends axially of the shaft 17 communicating with the square socket 21 at its upper end.

A ratchet drive handle 23 drives a square drive member 24 by means of a conventional ratchet mechanism (not shown). A bore 25 extends through the square drive member 24 and through the ratchet handle 23 as can be seen in FIG. 3. The square socket 21 is adapted to receive a drive member 24 which is retained therein by a ball detent 26. The bore 25 aligns with the bore 22 and has the same diameter to receive an elongate solid drive shaft 27.

The elongate drive shaft 27 has a square depending end portion 28 with a ball detent 29 mounted therein. An enlarged portion 30 on the upper end of the shaft 27 has a square socket 31 formed therein to receive the square drive member 32 of a conventional ratchet handle 33.

A generally cylindrical coupler 34 is provided with a square socket 35 adapted to engage over the square depending member 28 of the shaft 27. The coupler 34 has a transverse slot 36 extending across the lower face thereof for engaging with a flat portion 37 on the threaded shaft 38 of the shock absorber 14.

In the use and operation of the invention the tool is assembled as illustrated in FIGS. 1 and 2 and is then engaged over the nut 13 and shaft 38 of a shock absorber 14. The coupler 34 couples with the flat portion 37 of the shaft 38 and the socket member 11 engages with the nut 13. With the tool in this position the ratchet handles 23, 33 are manipulated to rotate the nut 13 on the threaded shaft 38 to either tighten the nut 13 or to loosen the same when removing the shock absorber 14 from the vehicle.

The bore 15 in the socket member 11 is slightly larger than the diameter of the coupler 34 and the bores 22, 25 are slightly larger than the diameter of the drive shaft 27 so that the coupler 34 and the drive shaft 27 are guided as they are rotated in their respective bores.

Having thus described the preferred embodiment of the invention it should be understood that numerous structural modifications and adaptations may be resorted to without departing from the spirit of the invention.

What is claimed is:

1. A shock absorber nut removing tool comprising in combination an elongate nut engaging socket member having a bore extending substantially therethrough, a square socket communicating with said bore in the upper end of said socket member, an elongate hollow drive shaft having a square end portion adapted for seating in the square socket of said socket member, a ratchet handle detachably connected to the upper end of said hollow drive shaft and having a bore extending therethrough axially aligned with a bore in said hollow drive shaft, an elongate solid drive shaft extending through the bore in said ratchet handle and said hollow drive shaft, a ratchet handle detachably connected to the upper end of said solid drive shaft, a generally cylindrical coupler member detachably connected to the lower end of said solid drive shaft with said coupler member having a transverse slot extending across the lower face thereof, said bores in said hollow drive shaft and said first named ratchet handle having a diameter slightly larger than the diameter of said solid drive shaft to guide said solid drive shaft as it is rotated with respect to said ratchet handle and said hollow drive shaft, said bore in said socket member having a diameter slightly greater than the diameter of said cylindrical coupler to guide said cylindrical coupler as it is rotated in said socket member.

* * * * *